(12) United States Patent
Tomari et al.

(10) Patent No.: US 11,185,884 B2
(45) Date of Patent: Nov. 30, 2021

(54) PREFORM COATING DEVICE AND PREFORM COATING METHOD

(71) Applicant: SUNTORY HOLDINGS LIMITED, Osaka (JP)

(72) Inventors: Ichiro Tomari, Tokyo (JP); Ryo Yamane, Kanagawa (JP); Hideyuki Suzuki, Tokyo (JP); Masanori Nishiyama, Tokyo (JP)

(73) Assignee: SUNTORY HOLDINGS LIMITED, Osaka (JP)

( * ) Notice: Subject to any disclaimer, the term of this patent is extended or adjusted under 35 U.S.C. 154(b) by 0 days.

(21) Appl. No.: 15/764,468

(22) PCT Filed: Sep. 23, 2016

(86) PCT No.: PCT/JP2016/078082
§ 371 (c)(1),
(2) Date: Mar. 29, 2018

(87) PCT Pub. No.: WO2017/057198
PCT Pub. Date: Apr. 6, 2017

(65) Prior Publication Data
US 2018/0264517 A1 Sep. 20, 2018

(30) Foreign Application Priority Data

Sep. 30, 2015 (JP) .............................. JP2015-193745
Sep. 30, 2015 (JP) .............................. JP2015-193789
Sep. 30, 2015 (JP) .............................. JP2015-194765

(51) Int. Cl.
*B05D 3/12* (2006.01)
*B05D 7/02* (2006.01)
(Continued)

(52) U.S. Cl.
CPC .................. *B05D 3/12* (2013.01); *B05C 5/00* (2013.01); *B05C 5/02* (2013.01); *B05C 5/0254* (2013.01);
(Continued)

(58) Field of Classification Search
CPC ........... B05C 11/08; B05D 3/12; B05D 1/002; B05D 1/26; B05D 1/28; B05D 7/02;
(Continued)

(56) References Cited

U.S. PATENT DOCUMENTS 3,921,575 A   11/1975  Ishii et al.
3,953,626 A   4/1976   Suzuki et al.
(Continued)

FOREIGN PATENT DOCUMENTS

CN   101690926 A   4/2010
CN   101905209 A   12/2010
(Continued)

OTHER PUBLICATIONS

European Patent Office, Extended European Search Report for European Patent Application No. 16851372.9, dated Aug. 8, 2019.
(Continued)

*Primary Examiner* — Jethro M. Pence
(74) *Attorney, Agent, or Firm* — Faegre Drinker Biddle & Reath LLP (57) ABSTRACT

The present invention provides a preform coating device (5) provided with: a rotating and holding part (9) that holds a preform (1) in a horizontal direction, and rotates the preform (1) about an axis (A) of the preform (1); and a dispenser (6) that has a slot (62) and discharges a coating liquid in a plane form from the slot (62) to the preform (1), wherein the discharge direction of the coating liquid is the direction of the normal to an outer peripheral surface of the preform (1).

11 Claims, 10 Drawing Sheets

(51) Int. Cl.

| | | |
|---|---|---|
| *C09D 201/00* | (2006.01) | |
| *B05D 1/00* | (2006.01) | |
| *C09D 5/00* | (2006.01) | |
| *B29C 49/02* | (2006.01) | |
| *B29B 11/14* | (2006.01) | |
| *B05D 1/26* | (2006.01) | |
| *B05C 5/02* | (2006.01) | |
| *B05C 13/02* | (2006.01) | |
| *B05C 5/00* | (2006.01) | |
| *B05C 9/14* | (2006.01) | |
| *B05C 11/10* | (2006.01) | |
| *B29L 9/00* | (2006.01) | |
| *B29L 31/00* | (2006.01) | |
| *B05D 1/28* | (2006.01) | |
| *B05D 3/02* | (2006.01) | |
| *B01D 69/02* | (2006.01) | |
| *B01D 69/08* | (2006.01) | |

(52) U.S. Cl.
CPC ............... *B05C 9/14* (2013.01); *B05C 11/10* (2013.01); *B05C 13/02* (2013.01); *B05C 13/025* (2013.01); *B05D 1/002* (2013.01); *B05D 1/26* (2013.01); *B05D 7/02* (2013.01); *B29B 11/14* (2013.01); *B29C 49/02* (2013.01); *C09D 5/00* (2013.01); *C09D 201/00* (2013.01); *B01D 69/02* (2013.01); *B01D 69/08* (2013.01); *B05D 1/28* (2013.01); *B05D 3/0254* (2013.01); *B05D 2254/02* (2013.01); *B29B 2911/1402* (2013.01); *B29B 2911/1404* (2013.01); *B29B 2911/1408* (2013.01); *B29B 2911/14026* (2013.01); *B29B 2911/1428* (2013.01); *B29B 2911/14273* (2013.01); *B29K 2995/0067* (2013.01); *B29L 2009/005* (2013.01); *B29L 2031/7158* (2013.01)

(58) Field of Classification Search
CPC ............ B05D 3/0254; B05D 2254/02; B29B 11/14; B29B 2911/1402; B29B 2911/14026; B29B 2911/1404; B29B 2911/1408; B29B 2922/14273; B29B 2911/1428
See application file for complete search history.

(56) References Cited

U.S. PATENT DOCUMENTS

| | | | |
|---|---|---|---|
| 4,127,633 A | 11/1978 | Addleman | |
| 5,039,560 A | 8/1991 | Durgin et al. | |
| 6,379,796 B1 | 4/2002 | Uenishi et al. | |
| 6,391,408 B1* | 5/2002 | Hutchinson | B65D 1/0215 428/35.7 |
| 7,048,975 B1 | 5/2006 | Toio et al. | |
| 2005/0034656 A1* | 2/2005 | Park | B05C 5/0208 118/304 |
| 2005/0220997 A1 | 10/2005 | Kronseder et al. | |
| 2007/0082135 A1* | 4/2007 | Lee | C03C 17/005 427/346 |
| 2008/0032051 A1* | 2/2008 | Hutchinson | B05D 1/18 427/385.5 |
| 2011/0034992 A1 | 2/2011 | Papp | |
| 2012/0276753 A1 | 11/2012 | Yoshihara et al. | |
| 2012/0306126 A1* | 12/2012 | Fuss | B65D 23/0821 264/512 |
| 2017/0136677 A1 | 5/2017 | Sugimori et al. | |
| 2018/0086570 A1 | 3/2018 | Doudement et al. | |
| 2020/0338590 A1 | 10/2020 | Tomari et al. | |
| 2021/0060600 A1 | 3/2021 | Nishiyama et al. | |

FOREIGN PATENT DOCUMENTS

| | | |
|---|---|---|
| CN | 102639255 A | 8/2012 |
| CN | 102759860 A | 10/2012 |
| CN | 105170371 A | 12/2015 |
| CN | 107454867 A | 12/2017 |
| EP | 0142583 A1 | 5/1985 |
| JP | S50-67341 A | 6/1975 |
| JP | S52-053947 A | 4/1977 |
| JP | S61-118757 A | 6/1986 |
| JP | H09-75820 A | 3/1997 |
| JP | H09-276667 A | 10/1997 |
| JP | 2000-126559 A | 5/2000 |
| JP | 2005-532167 A | 10/2005 |
| JP | 4139456 B2 | 8/2008 |
| JP | 2012-250771 A | 12/2012 |
| JP | 2014-151632 A | 8/2014 |
| JP | 6037879 B2 | 12/2016 |
| JP | 2017-64640 A | 4/2017 |
| JP | 2017-65149 A | 4/2017 |
| WO | WO-03/106140 A2 | 12/2003 |
| WO | WO-2004/004929 A1 | 1/2004 |
| WO | WO-2011/017340 A1 | 2/2011 |

OTHER PUBLICATIONS

Australian Patent Office, Examination Report for Australian Patent Application No. 2016331541, dated Aug. 22, 2019.
International Search Report dated Dec. 20, 2016 for PCT/JP2016/078082.
International Search Report dated Mar. 12, 2019 for PCT/JP2018/047669.
International Preliminary Report dated Jun. 30, 2021 for PCT/JP2018/047669.
Written Opinion dated Mar. 12, 2019 for PCT/JP2018/047669.
Office Action dated May 5, 2021 issued in U.S. Appl. No. 16/957,542.
Extended European search report dated Aug. 4, 2021 for European patent application No. 18896279.9.

* cited by examiner

PREFORM COATING DEVICE AND PREFORM COATING METHOD

CROSS REFERENCE TO RELATED APPLICATIONS:

This application is the National Stage of International Application No. PCT/JP2016/078082 filed Sep. 23, 2016 and claims benefit of Japanese Application No. 2015-193745 filed on Sep. 30, 2015, Japanese Application No. 2015-193789 filed on Sep. 30, 2015 and Japanese Application No. 2015-194765 filed on Sep. 30, 2015.

TECHNICAL FIELD

The present invention relates to a preform coating device and preform coating method for coating a preform for plastic bottle use with a coating solution.

BACKGROUND ART

Today, plastic containers made of polyethylene terephthalate (PET) (PET bottles) and other plastic bottles are being widely used for beverages and food. Plastic bottles are shaped by expanding test tube shaped preforms by stretch blow molding.

As disclosed by Japanese Patent Publication No. 2012-250771A, it is known to form a barrier coating on the outer circumferential surface of a preform so as to reduce passage of gas such as oxygen and carbon dioxide between the inside and outside of the plastic bottle. The barrier coating is formed by coating a coating solution on the outer circumferential surface of the preform and drying the coated coating solution. As the method of coating the coating solution, for example, several methods are known such as the one described in FIG. 2 of Japanese Patent Publication No. 2014-151632A.

SUMMARY OF INVENTION

Technical Problem

However, in a dipping system and blow system where the coating solution is coated on a preform held in a vertical state, the coating layer formed on the preform becomes thicker toward the bottom part of the preform. Further, in a coater system and transfer system, bubbles are easily formed in the coating solution coated on the preform. Therefore, in the past, it was difficult to make the coating layer formed on a preform uniform.

Therefore, the present invention was made in consideration of the above problems and has as its object to make the coating layer formed on the preform more uniform.

Solution to Problem

In order to solve the above problem, in a first embodiment, there is provided a preform coating device comprising: a rotary holder holding a preform in a horizontal direction and making the preform rotate about an axial line of the preform; and a dispenser having a slot and discharging a coating solution toward the preform from the slot in a planar state, wherein a direction of discharge of the coating solution is a normal line direction of an outer circumferential surface of the preform.

In a second embodiment, the dispenser pulls the coating solution back into the dispenser when stopping discharge of the coating solution in the first embodiment.

In a third embodiment, the dispenser discharges the coating solution until the preform rotates by 0.5 turn to less than 1 turn in the first or second embodiment.

In a fourth embodiment, a longitudinal width of the slot can be adjusted and the rotary holder slows a rotational speed of the preform when the longitudinal width of the slot is relatively narrow compared to when the longitudinal width of the slot is relatively broad in any one of the first to third embodiments.

In a fifth embodiment, the longitudinal width of the slot is 0.1 mm to 1.0 mm in the fourth embodiment.

In a sixth embodiment, the preform coating device further comprises a deaeration module for deaerating the coating solution supplied to the dispenser, the deaeration module including hollow fiber membranes in any one of the first to fifth embodiments.

In a seventh embodiment, the coating solution is a barrier coating solution having a gas barrier property or a protective coating solution for protecting the barrier coating solution in any one of the first to sixth embodiments.

In an eighth embodiment, there is provided a preform coating method comprising: a step of holding a preform in a horizontal direction and making the preform rotate about an axial line of the preform; and a step of discharging a coating solution toward the rotating preform from a slot of the dispenser in a planar state, wherein a direction of discharge of the coating solution is a normal line direction of an outer circumferential surface of the preform.

In a ninth embodiment, the preform coating method further comprises pulling the coating solution back into the dispenser when stopping discharge of the coating solution in the eighth embodiment.

In a tenth embodiment, the preform coating method further comprises discharging the coating solution until the preform rotates by 0.5 turn to less than 1 turn in the eighth or ninth embodiment.

In an eleventh embodiment, the preform coating method further comprises slowing the rotational speed of the preform when a longitudinal width of the slot is relatively narrow compared to when the longitudinal width of the slot is relatively broad in any one of the eighth to tenth embodiments.

In a twelfth embodiment, the longitudinal width of the slot is 0.1 mm to 1.0 mm in eleventh embodiments.

In a thirteenth embodiment, the preform coating method further comprises a step of using a deaeration module having hollow fiber membranes to deaerate the coating solution supplied to the dispenser in any one of the eighth to twelfth embodiments.

In a fourteenth embodiment, there is provided a preform coating device comprising: a rotary holder holding a preform in a horizontal direction and making the preform rotate about an axial line of the preform; a conveyor conveying the preform by moving the rotary holder; a dispenser discharging a coating solution toward the preform; and a dryer arranged separated from the dispenser and drying the coating solution coated on the preform, wherein the conveyor conveys the preform in a state held in a horizontal direction.

In a fifteenth embodiment, the rotary holder grips an opening part of the preform and makes the preform rotate while the dispenser is discharging the coating solution, and the preform coating device further comprises a preform support, the preform support supporting a bottom part side end of the cylindrical body part of the preform while the dispenser is discharging the coating solution in the fourteenth embodiment.

In a sixteenth embodiment, at least the part of the preform support contacting the preform is comprised of polyoxymethylene in the fifteenth embodiment.

In a seventeenth embodiment, the rotary holder makes the preform rotate while the dryer is drying the coating solution in any one of the fourteenth to sixteenth embodiments.

In a eighteenth embodiment, the preform coating device comprises a plurality of rotary holders, and the conveyor successively conveys the plurality of preforms in any one of the fourteenth to seventeenth embodiments.

In a nineteenth embodiment, there is provided a preform coating method comprising: a step of using a deaeration module having hollow fiber membranes to deaerate a coating solution; and a step of coating the deaerated coating solution on a preform.

In a twentieth embodiment, the coating solution to be deaerated is not degassed in advance in the nineteenth embodiment.

In a twenty-first embodiment, the coating solution is a barrier coating solution having a gas barrier property or a protective coating solution for protecting the barrier coating solution in any one of the eighth to thirteenth, nineteenth and twentieth embodiments.

In a twenty-second embodiment, the coating solution has a viscosity of 25 mPa·s to 10000 mPa·s in any one of the nineteenth to twenty-first embodiments.

In a twenty-third embodiment, the coating solution has a viscosity of 50 mPa·s to 10000 mPa·s in the twenty-second embodiment.

In a twenty-fourth embodiment, the coating solution has a viscosity of 100 mPa·s to 10000 mPa·s in the twenty-third embodiment.

Advantageous Effects of Invention

According to the present invention, it is possible to make the coating layer formed on the preform more uniform.

DESCRIPTION OF EMBODIMENTS

Below, embodiments of the present invention will be described in detail with reference to the drawings. Note that, in the following explanation, similar components will be assigned the same reference notations.

<Method of Forming Plastic Bottle>

Figure 1:
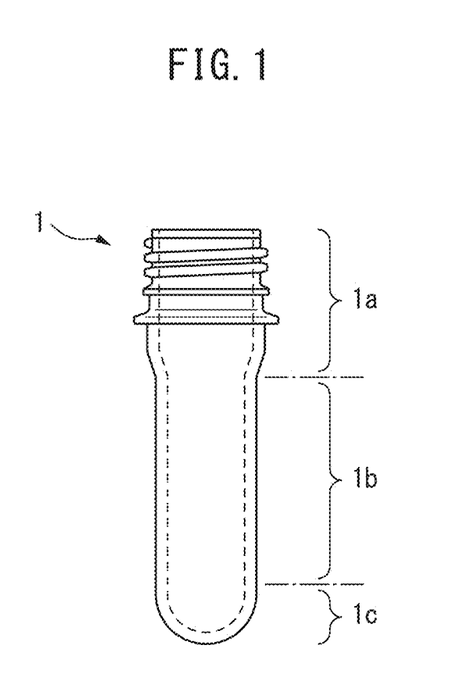
FIG. 1 shows a preform for plastic bottle use.
Figure 2:
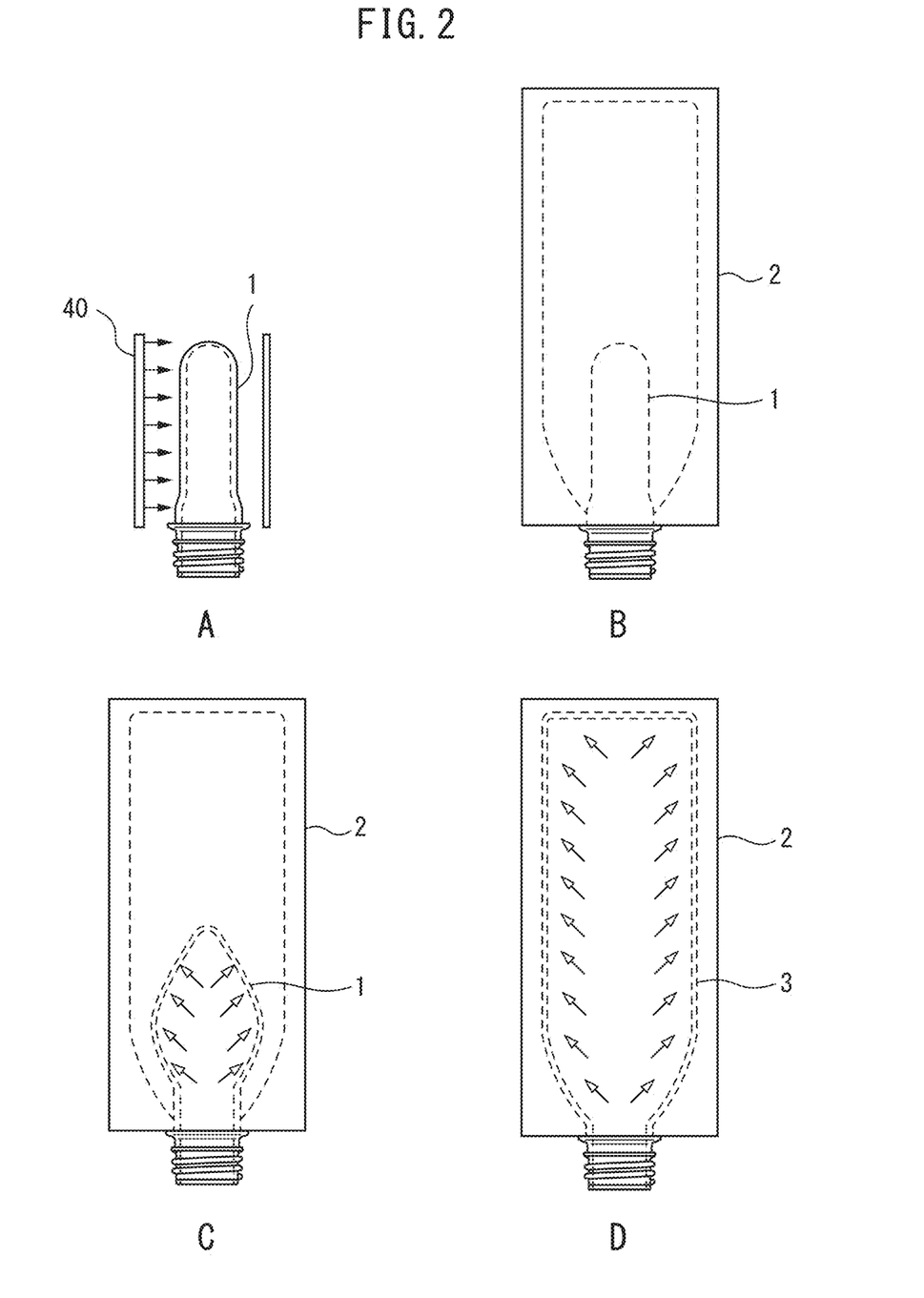
FIGS. 2A to 2D show the stretch blow molding method for shaping a plastic bottle from a preform.
Figure 3:
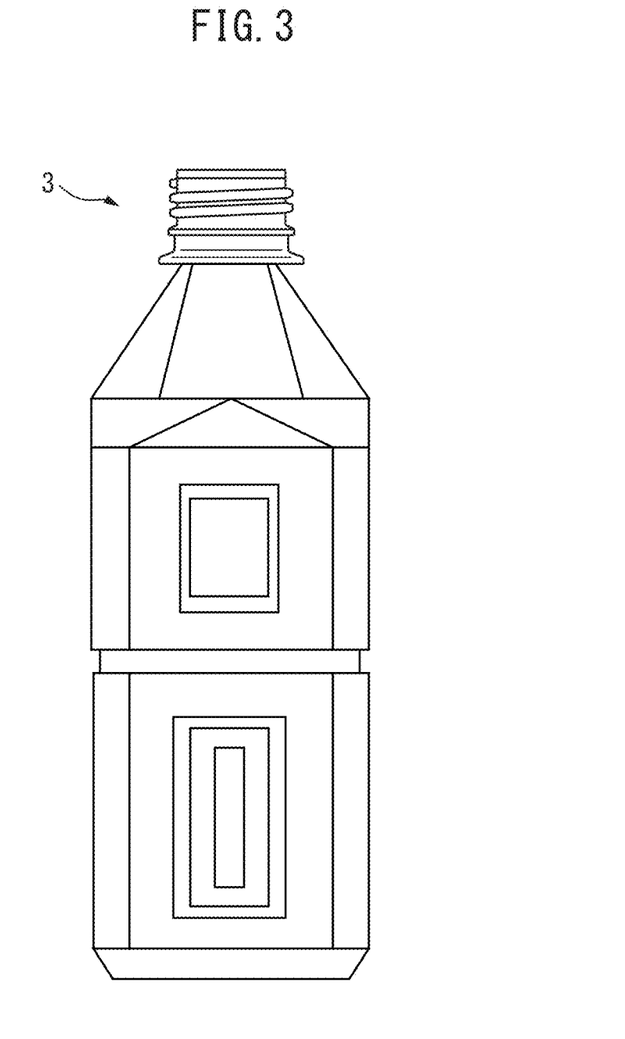
FIG. 3 shows a plastic bottle shaped from a preform.

First, referring to FIG. 1 to FIG. 3, a method for shaping a plastic bottle from a preform will be briefly explained. Note that, in the Description, a "plastic bottle" means a bottle made from a plastic such as polyethylene terephthalate (PET), polypropylene (PP), and polyethylene (PE) and is not limited to PET bottles.

FIG. 1 shows a preform 1 for plastic bottle use. The preform 1 is shaped from a resin by injection molding or PCM (preform compression molding). The preform 1 is comprised of an opening part 1a fitting with a cap of a plastic bottle, a cylindrical body part 1b adjoining the opening part 1a, and a bottom part 1c closing one end of the cylindrical body part 1b, and has a shape like a test tube. At the outer circumferential surface of the opening part 1a, a male thread is formed for screwing into a female thread of the cap of the plastic bottle. The end of the preform 1 at the opening part 1a side is open.

After the preform 1 is shaped, a barrier coating is formed on the outer circumferential surface of the preform 1. The barrier coating is formed by coating a coating solution on the outer circumferential surface of the preform 1 and drying the coated coating solution. The barrier coating can reduce the passage of gas such as oxygen and carbon dioxide between the inside and outside of a plastic bottle formed from the preform 1 and extend the shelf life of beverages etc., contained in the plastic bottle. Further, the barrier coating can also improve the scratch resistance, moisture-proofness, etc., of the plastic bottle.

A plastic bottle is shaped from the preform 1 by stretch blow molding. FIGS. 2A to 2D show the stretch blow molding method for forming a plastic bottle 3 from a preform 1. First, as shown in FIG. 2A, the preform 1 is heated by a preform heating device 40. Next, as shown in FIG. 2B, the preform 1 is inserted into a die 2 and the die 2 is closed. Next, as shown in FIG. 2C, the preform 1 is stretched by a stretching rod (not shown) in the vertical direction and stretched by compressed air in the horizontal direction. Next, as shown in FIG. 2D, when the preform 1 swells to the desired shape, cooling air is used to cool the inside surface of the plastic bottle 3. Finally, the plastic bottle 3 is taken out from the die 2. FIG. 3 shows the plastic bottle 3 shaped from the preform 1.

<Preform Coating Device>

Figure 4:
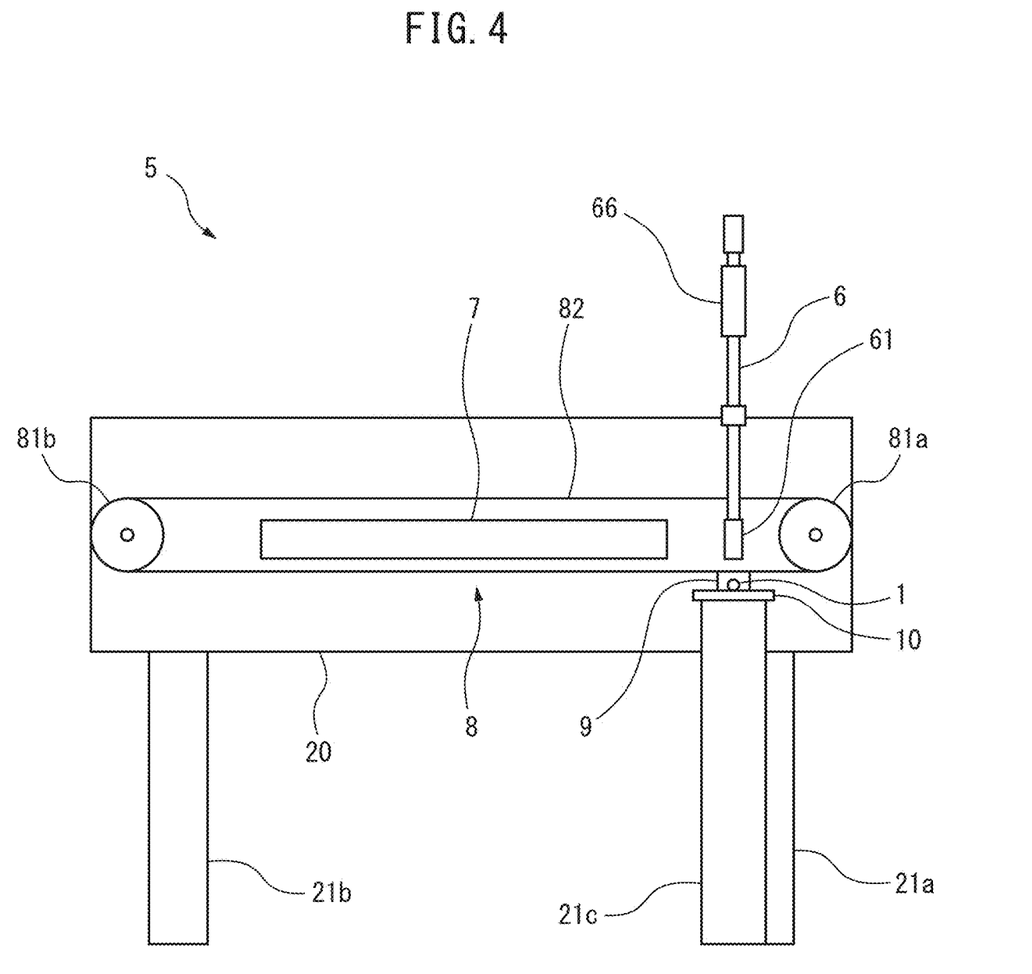
FIG. 4 is a schematic front view of main parts of a preform coating device according to an embodiment of the present invention.

Below, referring to FIG. 4 to FIG. 8, a preform coating device according to an embodiment of the present invention will be explained in detail. FIG. 4 is a schematic front view of main parts of the preform coating device 5 according to an embodiment of the present invention.

The preform coating device 5 is configured to coat the preform 1 with a coating solution and dry the coated coating solution to thereby form a barrier coating on the outer circumferential surface of the preform 1. For this reason, the preform coating device 5 is provided with a dispenser 6 for coating the preform 1 with the coating solution, and a dryer 7 for drying the coated coating solution. The dryer 7 is arranged separated from the dispenser 6. In the present embodiment, the dryer 7 is arranged separated from the dispenser 6 in the horizontal direction.

The preform coating device 5 is further provided with a conveyor 8 for conveying the preform 1. The conveyor 8 makes the preform 1 move from the position of the dispenser 6 toward the position of the dryer 7. In the present embodiment, the conveyor 8 is a belt conveyor. The conveyor 8 has two pulleys 81a, 81b and a belt 82 stretched between the pulleys 81a, 81b. The pulleys 81a, 81b are rotatably fixed to a pulley support 20 extending in the horizontal direction. The pulley support 20 is supported by two support columns 21a, 21b extending in the vertical direction. Either of the pulleys 81a, 81b is driven by a motor (not shown). By making either of the pulleys 81a, 81b rotate clockwise in FIG. 4, the belt 82 is driven clockwise in FIG. 4. Due to this, the conveyor 8 can convey the preform 1. Note that, there may be three or more pulleys. Further, the conveyor 8 may be a chain conveyor or other mechanism so long as able to convey the preform 1.

Figure 5:
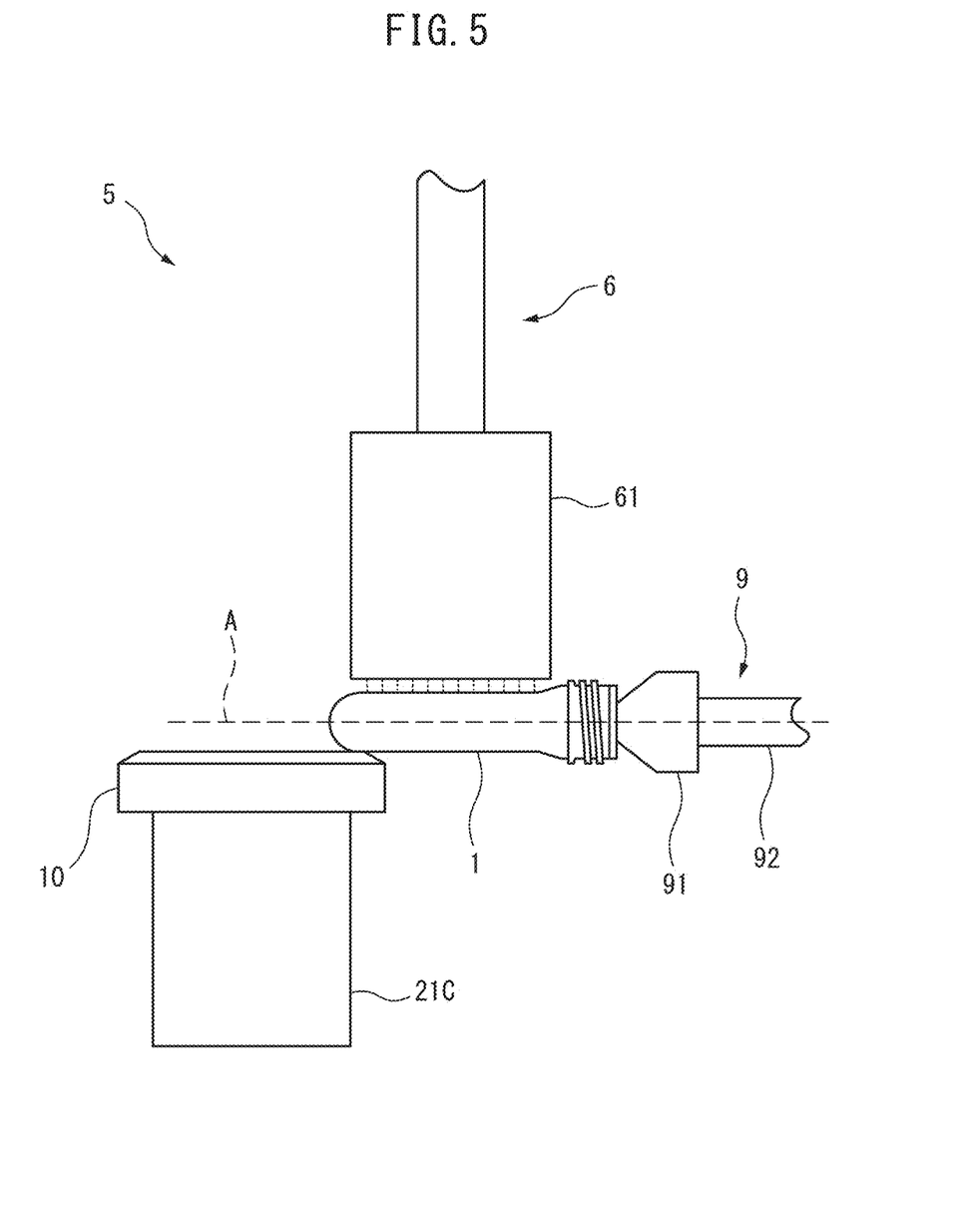
FIG. 5 is a schematic partial side view of a preform coating device when coating a coating solution.

FIG. 5 is a schematic partial side view of the preform coating device 5 when coating the coating solution. The preform coating device 5 is further provided with a rotary holder 9 which holds the preform 1 in the horizontal direction and makes the preform 1 rotate about the axial line A of the preform 1. The rotary holder 9 has a chuck 91 holding the opening part 1a of the preform 1, and a shaft 92 connected to the chuck 91.

The rotary holder 9 uses the chuck 91 to hold the opening part 1a of the preform 1 so as to hold the preform 1 in the horizontal direction. Therefore, the preform 1 is held by the rotary holder 9 at just one side. The chuck 91, for example, is a vacuum chuck which holds the preform 1 by air or a mechanical chuck which mechanically grips the preform 1. Note that, in the present embodiment, the chuck 91 holds the inside of the opening part 1a of the preform 1, but the chuck 91 may hold the outside of the opening part 1a of the preform 1.

The shaft 92 is driven by a motor (not shown) and rotates together with the chuck 91. The axial line of the shaft 92 is coaxial with the axial line A of the preform 1. Therefore, the preform 1 can be rotated about the axial line A of the preform 1 by rotating the rotary holder 9. Further, the rotary holder 9 can control the rotational speed of the motor to thereby control the rotational speed of the preform 1. The rotational speed of the preform 1 is for example 30 rpm to 240 rpm. The rotary holder 9, as shown in FIG. 4, is connected to the belt 82. For this reason, the conveyor 8 can make the rotary holder 9 move to thereby convey the preform 1.

Figure 6:
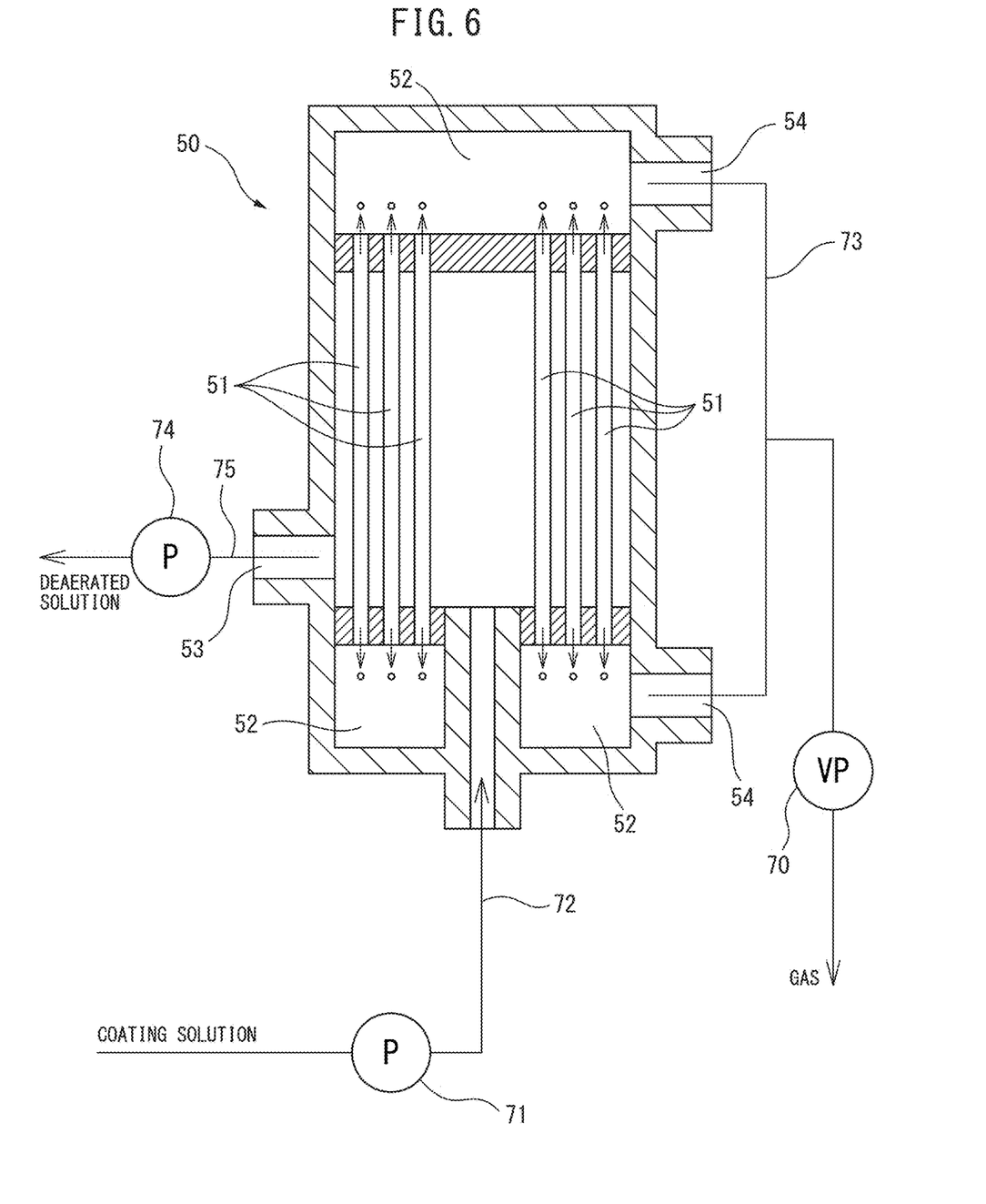
FIG. 6 is a schematic cross-sectional view of a deaeration module.

The preform coating device 5 is further provided with a deaeration module 50 for deaerating the coating solution supplied to the dispenser 6. FIG. 6 is a schematic cross-sectional view of the deaeration module 50. The deaeration module 50 has a plurality of thin pipe like hollow fiber membranes 51. The hollow fiber membranes 51 are comprised of polymethyl pentene (PMP), fluororesins (PFA, PTFE), etc. The hollow fiber membranes 51 have high permeability with respect to gases such as oxygen and nitrogen. On the other hand, the hollow fiber membranes 51 do not pass almost any liquid.

At the outsides of the both ends of the hollow fiber membranes 51, reduced pressure chambers 52 are formed. The reduced pressure chambers 52 are communicated with the insides of the hollow fiber membranes 51. The pressure inside the reduced pressure chambers 52 is made less than atmospheric pressure (for example, a vacuum) for deaeration. The pressure inside the reduced pressure chambers 52 is reduced by a vacuum pump 70 arranged outside of the deaeration module 50.

The coating solution before deaeration is supplied by a first supply pump 71 from a coating solution storage tank (not shown) through a first transport pipe 72 to the deaeration module 50. The coating solution flowing into the deaeration module 50 runs over the outsides of the hollow fiber membranes 51 and is sent out from the solution outflow opening 53 to the outside of the deaeration module 50. When the coating solution runs over the outsides of the hollow fiber membranes 51, the gases (oxygen and nitrogen) contained in the coating solution permeate into the hollow fiber membranes 51. The permeated gases pass through the insides of the hollow fiber members 51 and reach the reduced pressure chambers 52 due to the pressure difference between the outsides of the hollow fiber membranes 51 and the reduced pressure chambers 52. The gases reaching the reduced pressure chambers 52 pass through the exhaust pipe 73 from the gas outflow opening 54 and is discharged to the outside of the deaeration module 50.

Therefore, by passing the coating solution through the inside of the deaeration module 50, the coating solution can be deaerated and in turn generation of bubbles in the coating solution coated on the preform 1 can be suppressed. Further, due to the deaeration using the hollow fiber membranes 51, no rotating body such as an impeller is used for deaeration, so no shear force is applied to the coating solution. For this reason, it is possible to prevent changes in properties of the coating solution such as clouding of the coating solution.

As mentioned above, in the deaeration module 50 of the present embodiment, the fluid runs over the outsides of the hollow fiber membranes 51 while the gases passes through the insides of the hollow fiber membranes 51. Therefore, the deaeration module 50 of the present embodiment is a deaeration module of a so-called external reflux system. Note that, the deaeration module 50 may be a deaeration module of an internal reflux system where the fluid passes through the insides of the hollow fiber membranes 51 and the gases run over the outsides of the hollow fiber membranes 51. Further, the coating solution may be deaerated by passing the coating solution through the inside of the deaeration module 50 several times. The deaerated solution is supplied by a second supply pump 74 from the deaeration module 50 through a second transport pipe 75 to the dispenser 6. Note that, it is also possible to not use the second supply pump 74, but use only the first supply pump 71 to supply the coating solution to the deaeration module 50 and supply the deaerated coating solution to the dispenser 6.

The dispenser 6 holds the coating solution supplied from the deaeration module 50 and discharges the coating solution toward the preform 1. The dispenser 6 has a solution holding tank 66 for holding the coating solution and a nozzle 61 for discharging the coating solution.

Figure 7:
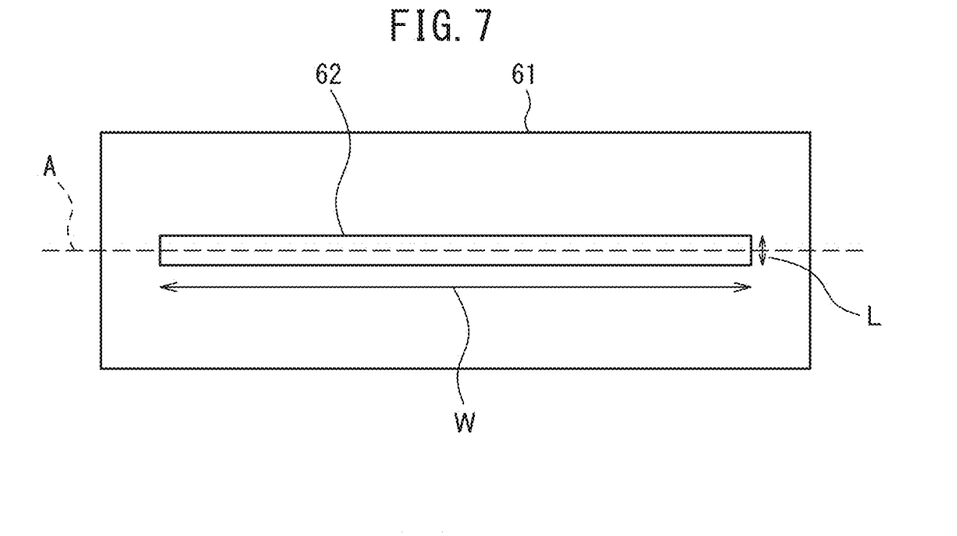
FIG. 7 is a bottom view of a nozzle of a dispenser.

FIG. 7 is a bottom view of the nozzle 61 of the dispenser 6. As shown in FIG. 7, at the front end of the nozzle 61, a slot 62 is formed as a discharge opening of the coating solution. FIG. 7 shows an axial line A of the preform 1 for showing the positional relationship between the slot 62 and the preform 1. The lateral width W of the slot 62 (dimension of preform 1 in axial line direction) can be adjusted and is for example 15 mm to 40 mm. Further, the longitudinal width L of the slot 62 (dimension of preform 1 in direction vertical to axial line direction) can be adjusted and is, for example, 0.1 mm to 1.0 mm. The dispenser 6 is arranged so that the line running through the center of the slot 62 in the longitudinal width L and the axial line A of the preform 1 become substantially coaxial.

The dispenser 6 discharges the coating solution toward the preform 1 from the slot 62 in a planar state. Further, as shown in FIG. 4 and FIG. 5, the dispenser 6 is arranged above the cylindrical body part 1b of the preform 1. For this reason, the nozzle 61 of the dispenser 6 discharges the coating solution toward the cylindrical body part 1b of the preform 1 in the vertical direction. In the present embodiment, the lateral width W of the slot 62 is substantially the same as the length of the cylindrical body part 1b of the preform 1. Further, the direction of discharge of the coating solution is the normal line direction of the outer circumferential surface of the preform 1. In the present embodiment, it is possible to discharge the coating solution from the slot 62 in the normal line direction of the outer circumferential surface of the preform 1 in a planar state to thereby reduce the variation in thickness of the coating layer formed on the preform 1 and keep bubbles from generating in the coating solution coated on the preform 1. As a result, it is possible to make the coating layer formed on the preform 1 more uniform.

Further, the dispenser 6 can move in the vertical direction. For this reason, the distance between the slot 62 and the cylindrical body part 1b of the preform 1 can be adjusted. The distance between the slot 62 and the cylindrical body part 1b of the preform 1 during discharge of the coating solution is for example 0.1 mm to 2.0 mm. Note that, in the present embodiment, the coating solution is discharged from above the preform 1, but the coating solution may be discharged from another direction, for example, from below the preform 1. In this case as well, the dispenser 6 is arranged so that the direction of discharge of the coating solution becomes the normal line direction of the outer circumferential surface of the preform 1 and is configured to enable the distance between the slot 62 and the cylindrical body part 1b of the preform 1 to be adjusted.

The conveyor 8 does not allow the rotary holder 9 to move while the dispenser 6 is discharging the coating solution. On the other hand, the rotary holder 9 makes the preform 1 rotate while the dispenser 6 is discharging the coating solution. The dispenser 6 discharges the coating solution while the preform 1 is rotating substantially once. The discharged coating solution is taken up by the outer circumferential surface of the cylindrical body part 1b of the preform 1. By doing this, the outer circumferential surface of the cylindrical body part 1b of the preform 1 is coated with the coating solution. At this time, the preform 1 is held in the horizontal direction, so the coating solution is prevented from becoming gradually thicker toward the bottom part 1c of the preform 1.

The number of rotations of the preform 1 from when the dispenser 6 starts discharging the coating solution to when the dispenser 6 stops it is for example 0.5 turn to less than 1 turn. In other words, the dispenser 6 discharges the coating solution until the preform 1 rotates by 0.5 turn to less than 1 turn. In this case, when the dispenser 6 stops discharging the coating solution, the coating solution is not connected in the circumferential direction of the cylindrical body part 1b. However, the rotary holder 9 continues to make the preform 1 rotate even after discharge of the coating solution is stopped. For this reason, the coating solution becomes connected in the circumferential direction of the cylindrical body part 1b due to the surface tension of the coating solution and the centrifugal force due to the rotation of the preform 1 after discharge of the coating solution has stopped, and the entire circumference of the cylindrical body part 1b is coated. Due to this, the coating solution is prevented from being coated at a part of the preform 1 in two layers and variation in the thickness of the coating layer formed on the preform 1 can be reduced. Note that, to reliably coat the coating solution over the entire circumference of the cylindrical body part 1b, the number of rotations of the preform 1 from when the dispenser 6 starts the discharge of the coating solution to when the dispenser 6 stops it is preferably 0.8 turn to less than 1 turn.

Further, the dispenser 6 pulls the coating solution back into the dispenser 6 when stopping the discharge of the coating solution. Due to this, it is possible to keep the coating solution from dripping down from the slot 62 when stopping discharge. As a result, variation of the thickness of the coating layer formed on the preform 1 is reduced and bubbles can be kept from generating at the coating solution coated on the preform 1.

Figure 8:
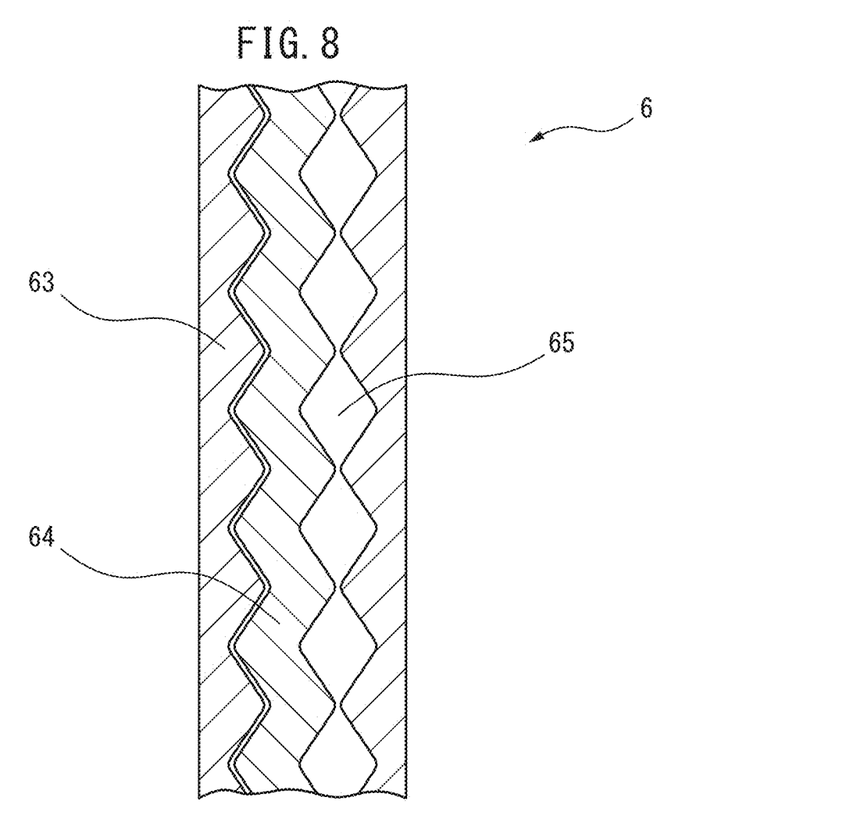
FIG. 8 is a partial front cross-sectional view of a dispenser.

FIG. 8 is a partial schematic cross-sectional view of a dispenser 6. The dispenser 6 is a so-called single axis eccentric screw pump and has a stator 63 and a rotor 64 housed rotatably inside the stator 63. The inside surface of the stator 63 has a female thread cut into it, while the outside surface of the rotor 64 has a male thread cut into it. The rotor 64 is driven to rotate by a drive device, for example, a motor. If the rotor 64 rotates inside the stator 63, the coating solution is sucked in from the solution holding tank 66 to the inside of the stator 63. Further, due to rotation of the rotor 64, a position of a cavity 65 defined by the stator 63 and the rotor 64 continuously moves to the slot 62 side in the longitudinal direction of the stator 63. As a result, the coating solution sucked in from the solution holding tank 66 of the dispenser 6 proceeds through the inside of the cavity 65 and is continuously discharged from the slot 62. The amount of discharge per unit time is proportional to the rotational speed of the rotor 64, so it is possible to control the rotational speed of the rotor 64 to thereby control the amount of discharge per unit time.

Further, it is possible to make the rotor 64 rotate in a direction opposite to that at the time of discharge to thereby make the coating solution move from the slot 62 side toward the solution holding tank 66. Therefore, the dispenser 6 can pull back the coating solution into the dispenser 6 by making the rotor 64 rotate in the direction opposite to that at the time of discharge when stopping discharge of the coating solution.

Note that, the dispenser 6 may use a configuration other than a single axis eccentric screw pump to discharge the coating solution. The dispenser 6 may, for example, be an air type dispenser using the force of compressed air to discharge the coating solution. In this case, when stopping the discharge of the coating solution, for example a vacuum pump may be used to reduce the pressure inside the dispenser to thereby pull the coating solution back into the dispenser.

Further, as mentioned above, in the present embodiment, the preform 1 is held by the rotary holder 9 at one side. For this reason, due to rotation of the preform 1, the outer circumferential surface of the preform 1 at the bottom part 1c side tries to separate from the axial line A of the preform 1. In other words, due to rotation of the preform 1, the preform 1 becomes eccentric. As a result, sometimes the coating solution coated on the preform 1 becomes uneven in thickness.

Therefore, in the present embodiment, in order to suppress eccentricity of the preform 1, the preform coating device 5 further comprises a preform support 10. The preform support 10 is supported by a support column 21c.

The preform support 10 supports the preform 1 to be able to rotate at least while the dispenser 6 is discharging the coating solution. The preform support 10 supports the bottom part 1c side end of the cylindrical body part 1b of the preform 1 so as not to contact the coated coating solution. At least the part of the preform support 10 contacting the preform 1 is comprised of a resin. Preferably, it is comprised of polyoxymethylene (POM). By doing this, it is possible to effectively suppress eccentricity of the preform 1 while suppressing damage to the preform 1 due to contact between the preform support 10 and the preform 1.

As mentioned above, the longitudinal width of the slot 62 of the dispenser 6 can be adjusted. The inventors of the present application discovered that the greater the longitudinal width of the slot 62, the greater the resistance to formation of bubbles at the coating solution coated on the preform 1. However, if increasing the longitudinal width of the slot 62, it becomes difficult to control the amount of discharge of the coating solution to a small amount. For this reason, if the desired thickness of the coating layer formed on the preform 1 is thin, it is necessary to decrease the longitudinal width of the slot 62 so as to reduce the amount of discharge of the coating solution. Therefore, in this case, it is necessary to use some means to suppress the formation of bubbles.

The inventors of the present application also discovered that the slower the rotational speed of the preform 1, the greater the resistance to formation of bubbles at the coating solution coated on the preform 1. Therefore, in the present embodiment, the rotary holder 9 slows the rotational speed of the preform 1 when the longitudinal width L of the slot 62 is relatively narrow compared to when the longitudinal width L of the slot 62 is relatively broad. By doing this, when the longitudinal width L of the slot 62 is narrow, for example, even when the desired thickness of the coating layer is thin, the formation of bubbles can be effectively suppressed. On the other hand, if it is possible to increase the longitudinal width L of the slot 62, it is possible to increase the rotational speed of the preform 1 to shorten the time required for coating the coating solution and possible to improve the productivity of the preform 1.

After the coating solution is coated, the preform 1 is conveyed by the conveyor 8 to the position of the dryer 7. The conveyor 8 holds the preform 1 in the horizontal direction and conveys it in that state. By doing this, during conveyance of the preform 1, the coating solution is kept from moving by gravity toward the bottom part 1c of the preform 1. Therefore, it is possible to reduce the variation in thickness of the coating layer at the outer circumferential surface of the preform 1.

The dryer 7 is a heater such as for example a carbon heater or a far-infrared ray heater. Note that, both a carbon heater and far-infrared ray heater may be used as the dryer 7. Further, the dryer 7 may be configured so as to dry the coating solution by light or air. The rotary holder 9 makes the preform 1 rotate while the dryer 7 is drying the coating solution. By doing this, it is possible to uniformly dry the coating solution coated on the preform 1.

After drying the coating solution, the conveyor 8 conveys the preform 1 to the downstream side of the dryer 7. After that, the rotary holder 9 releases the preform 1, and the preform 1 is taken out from the preform coating device 5. Therefore, according to the preform coating device 5, it is possible to automate the formation of the barrier coating on the outer circumferential surface of the preform 1.

<Preform Coating Method>

Figure 9:
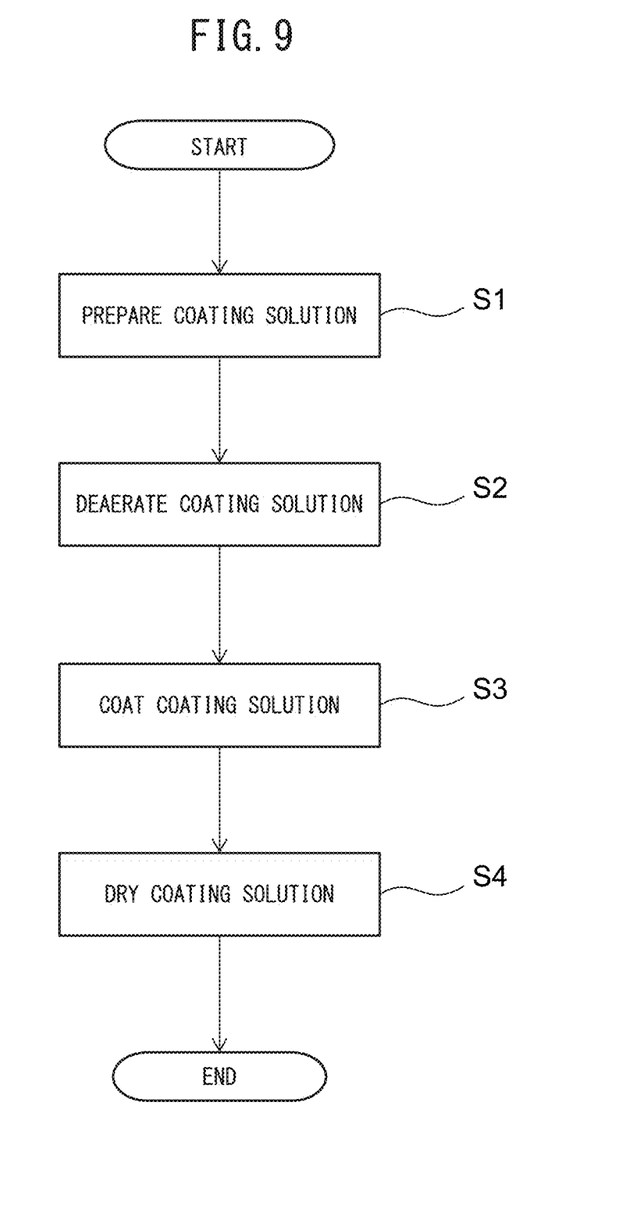
FIG. 9 is a flow chart showing a preform coating method according to an embodiment of the present invention.

Next, referring to FIG. 9, a preform coating method according to an embodiment of the present invention will be explained. FIG. 9 is a flow chart showing a preform coating method according to an embodiment of the present invention. The coating layer is formed on the preform 1 by the preform coating device 5.

First, at step S1, the coating solution is prepared. The coating solution is stored in a coating solution storage tank. The coating solution is, for example, a barrier coating solution having a gas barrier property such as a polyvinyl alcohol (PVA) solution. Note that, the coating solution may be a solution of a barrier resin such as a water soluble polyamide, water soluble polyester, polyvinylidene chloride (PVDC), polyacrylonitrile, ethylene-vinyl alcohol copolymer resin (EVOH), or polyglycolic acid. Further, the coating solution may be any of the above solutions in which an inorganic material is added. The viscosity of the coating solution is for example 25 mPa·s to 10000 mPa·s. Note that, when using a coating solution with a viscosity higher than water, bubbles easily generate in the coating solution coated on the preform 1. For this reason, when using a coating solution with a viscosity higher than water, it is possible to obtain more remarkable actions and effects by application of the present invention. Therefore, the viscosity of the coating solution used in the present embodiment is preferably higher, preferably 50 mPa·s to 10000 mPa·s, more preferably 100 mPa·s to 10000 mPa·s.

Next, at step S2, the coating solution prepared at step S1 is deaerated. In the present embodiment, the deaeration module 50 having the hollow fiber membranes 51 is used to deaerate the coating solution. Note that, in the present embodiment, the coating solution to be deaerated is not pretreated. This "pretreatment" includes, for example, degassing treatment applying shear force to the coating solution. Further, the coating solution may be deaerated by passing the coating solution through the inside of the deaeration module 50 several times. The deaerated coating solution is supplied to the dispenser 6.

Next, at step S3, the coating solution deaerated at step S2 is coated on the preform 1. Specifically, the rotary holder 9 is used to hold the preform 1 in the horizontal direction and make the preform 1 rotate about the axial line A of the preform 1. The coating solution is discharged in a planar state toward the rotating preform 1 from the slot 62 of the dispenser 6. At this time, the direction of discharge of the coating solution is the normal line direction of the outer circumferential surface of the preform 1. In the present embodiment, by discharging the coating solution in a planar state from the slot 62 in the normal line direction of the outer circumferential surface of the preform 1, it is possible to reduce variation of thickness of the coating layer formed on the preform 1 and possible to keep bubbles from generating at the coating solution coated on the preform 1. As a result, it is possible to make the coating layer formed on the preform 1 more uniform.

Further, at step S3, the coating solution is discharged from the dispenser 6 until the preform 1 rotates by 0.5 turn to less than 1 turn. In this case, the coating solution is coated over the entire circumference of the cylindrical body part 1b of the preform 1 due to the surface tension of the coating solution and the centrifugal force due to rotation of the preform 1 after the coating solution stops being discharged. Due to this, the coating solution is prevented from being coated at a part of the preform 1 in two layers and variation in the thickness of the coating layer formed on the preform 1 can be reduced. Note that, in order to reliably coat the coating solution over the entire circumference of the cylindrical body part 1b, preferably the coating solution is discharged from the dispenser 6 until the preform 1 rotates by 0.8 turn to less than 1 turn.

Further, in the present embodiment, when stopping the discharge of the coating solution, the coating solution is pulled back into the dispenser 6. By doing this, it is possible to keep the coating solution from dripping down from the slot 62 of the dispenser 6 when stopping discharge. As a result, variation of the thickness of the coating layer formed on the preform 1 is reduced and bubbles can be kept from generating at the coating solution coated on the preform 1. Further, in the present embodiment, in order to suppress eccentricity of the preform 1, during discharge of the coating solution, the preform support 10 is used to support the bottom part 1c side end of the cylindrical body part 1b of the preform 1 to be able to rotate.

Furthermore, in the present embodiment, the rotational speed of the preform 1 is made slower when the longitudinal width L (dimension in direction vertical to axial line of preform 1) of the slot 62 (discharge opening) of the dispenser 6 is relatively narrow compared to when the longitudinal width L of the slot 62 is relatively broad. By doing this, when the longitudinal width L of the slot 62 is narrow, for example, when the desired thickness of the coating layer is thin, the formation of bubbles can be effectively suppressed. On the other hand, when the longitudinal width L of the slot 62 can be made broader, it is possible to make the rotational speed of the preform 1 faster to shorten the time required for coating the coating solution and possible to improve the productivity of the preform 1. Note that, the rotational speed of the preform 1 may be made slower in steps or slower linearly as the longitudinal width L of the slot 62 becomes narrower. The preform 1 coated with the coating solution is conveyed by the conveyor 8 from the position of the dispenser 6 to the position of the dryer 7.

Next, at step S4, the coating solution coated on the preform 1 at step S3 is dried by the dryer 7. By drying the coating solution, a barrier coating is formed on the outer circumferential surface of the preform 1.

Note that, it is also possible to coat a barrier coating solution having a gas barrier property on the preform 1, then further coat a protective coating solution for protecting the barrier coating solution over the barrier coating solution. The protective coating solution is, for example, a nonwater soluble coating agent such as a polyolefin dispersion, various modified polyolefin dispersion, or polyvinyl butyral (PVB). The viscosity of the protective coating solution is for example 0.5 mPa·s to 100 mPa·s. The protective coating solution is coated by the preform coating device 5 on the preform 1 by a method similar to the above-mentioned step S1 to step S4.

EXAMPLES

The longitudinal width L of the slot 62 of the dispenser 6 and the rotational speed of the preform 1 were changed to coat a coating solution on preforms 1 by the preform coating device 5. The coating solution was made a PVA solution with a viscosity of 900 mPa·s. Further, the distance between the slot 62 and the cylindrical body part 1b of the preform 1 during discharge was made 0.2 mm, the lateral width W of the slot 62 was made 30 mm, and the amount of discharge per discharge was made 400 mg. Whether or not bubbles were generated in the coating solution coated on the preforms 1 under the above conditions was evaluated. Note that, formation of bubbles was determined by visual examination. The results are shown in Table 1.

TABLE 1

| | | \multicolumn{5}{c}{Length of slot (mm)} | | | | |
|---|---|---|---|---|---|---|
| | | 0.1 | 0.2 | 0.5 | 0.75 | 1.0 |
| Rotational speed of preform (rpm) | 240 | Poor | Poor | Poor | Good | Good |
| | 120 | Poor | Poor | Poor | Good | Good |
| | 80 | Poor | Poor | Poor | Good | Good |
| | 60 | Poor | Poor | Good | Good | Good |
| | 30 | Good | Good | Good | Good | Good |

In Table 1, "Good" indicates no bubbles were generated, while "Poor" indicates bubbles were generated. According to Table 1, it is learned that the broader the longitudinal width of the slot 62, the greater the resistance to formation of bubbles at the coating solution coated on the preform 1. Further, it is learned that the slower the rotational speed of the preform 1, the greater the resistance to formation of bubbles at the coating solution coated on the preform 1. Further, it is learned that even if the longitudinal width of the slot 62 is narrow, by slowing the rotational speed of the preform 1, formation of bubbles is suppressed.

Above, preferred embodiments according to the present invention were explained, but the present invention is not limited to these embodiments and can be modified and changed in various ways within the language of the claims.

For example, the coating solution may be supplied by a pump etc., from the coating solution storage tank to the dispenser 6 directly without going through the deaeration module 50. Further, the preform coating device 5 may be provided with a plurality of rotary holders 9. In this case, the plurality of rotary holders 9 may be arranged separated along the belt 82 of the conveyor 8 at predetermined intervals and the conveyor 8 can continuously convey a plurality of preforms 1. Due to this configuration, a plurality of preforms 1 can be continuously coated and in turn the productivity of the preforms 1 can be raised.

Further, when using a deaeration module 50, it is not necessarily required to use a preform coating device 5 to coat the coating solution on the preform 1. For example, the methods of coating shown in FIG. 10 to FIG. 13 may be used to coat the coating solution on the preform 1.

Figure 10:
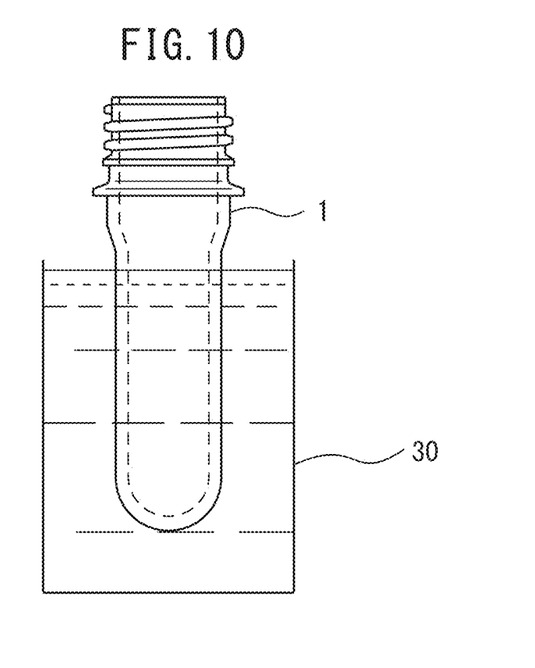
FIG. 10 schematically shows a method of coating a coating solution by a dipping system.
Figure 11:
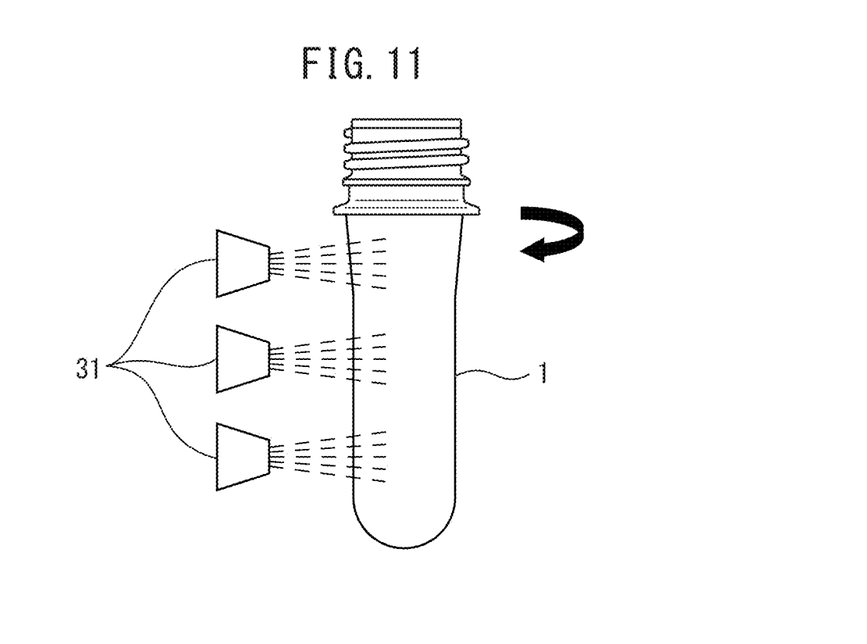
FIG. 11 schematically shows a method of coating a coating solution by a blow system.

FIG. 10 schematically shows a method of coating a coating solution by a dipping system. In the dipping system, the preform 1 is dipped in a coating solution held in a container 30 to thereby coat the preform 1 with the coating solution. FIG. 11 schematically shows a method of coating a coating solution by a blow system. In the blow system, an injector like the sprayer 31 is used to spray the coating solution on the preform 1 whereby the preform 1 is coated by the coating solution.

Figure 12:
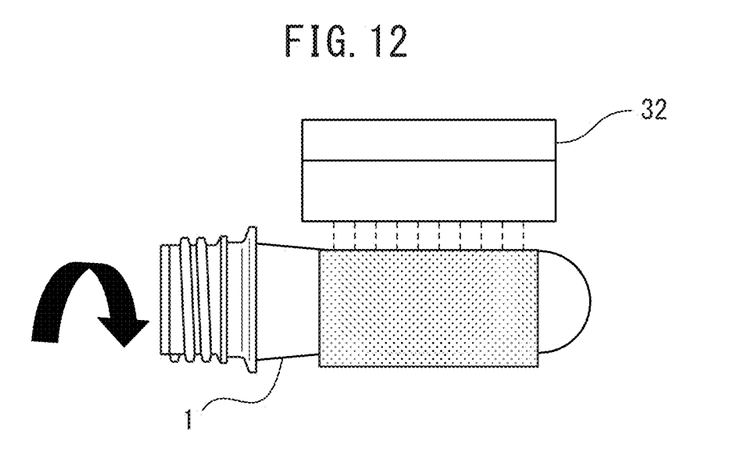
FIG. 12 schematically shows a method of coating a coating solution by a coater system.
Figure 13:
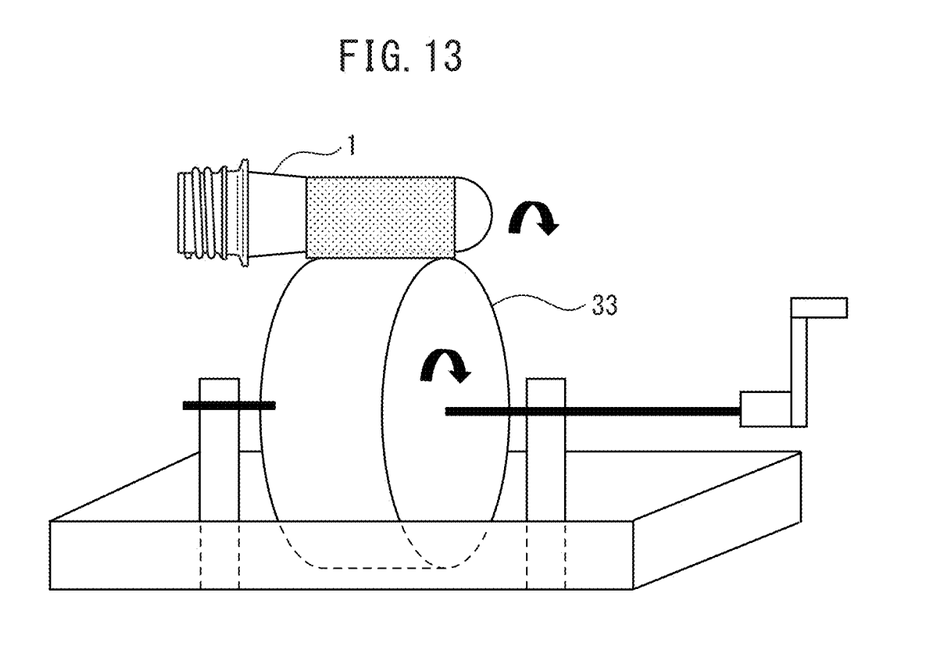
FIG. 13 schematically shows a method of coating a coating solution by a roller transfer system.

FIG. 12 schematically shows a method of coating a coating solution by a coater system. The coater system discharges coating solution from the slot of the die coater 32 toward the preform 1 whereby the preform 1 is coated by the coating solution. FIG. 13 schematically shows the method of coating the coating solution by the roller transfer system. The roller transfer system transfers a coating solution coated on the outer surface of a roller 33 to the preform 1 by rotation of the roller 33 whereby the preform 1 is coated by the coating solution.

REFERENCE SIGNS LIST 1. preform
1a. opening part 1b. cylindrical body part
1c. bottom part
2. die
3. plastic bottle
5. preform coating device
6. dispenser
61. nozzle
62. slot
7. dryer
8. conveyor
9. rotary holder
10. preform support
50. deaeration module
51. hollow fiber membranes
L. longitudinal width of slot 62
W. lateral width of slot 62

The invention claimed is:

1. A preform coating device having a horizontal direction normal to gravity, the preform coating device comprising:
   a rotary holder configured to:
      hold a preform comprised of an opening part, a hollow cylindrical body part adjoining the opening part, and a bottom part closing one end of the hollow cylindrical body part and having an axial line in the horizontal direction centered within the hollow cylindrical body part, and
      rotate the preform about the axial line, wherein the rotary holder grips the opening part of the preform and makes the preform rotate while a dispenser is discharging a coating solution;
   a preform support positioned, in a vertical direction, under a bottom part side end of the hollow cylindrical body part to support the bottom part side end of the hollow cylindrical body part of the preform while the dispenser is discharging the coating solution; and
   the dispenser having a slot and being configured to discharge the coating solution toward the preform from the slot in a planar state, wherein a direction of discharge of the coating solution is a normal line direction of an outer circumferential surface of the preform.

2. The preform coating device according to claim 1, wherein the dispenser pulls the coating solution back into the dispenser when stopping discharge of the coating solution.

3. The preform coating device according to claim 1, wherein the dispenser discharges the coating solution until the preform rotates by 0.5 turn to less than 1 turn.

4. The preform coating device according to claim 1, wherein
   a longitudinal width of the slot can be adjusted and
   the rotary holder slows a rotational speed of the preform when the longitudinal width of the slot is relatively narrow compared to when the longitudinal width of the slot is relatively broad.

5. The preform coating device according to claim 4, wherein the longitudinal width of the slot is 0.1 mm to 1.0 mm.

6. The preform coating device according to claim 1, further comprising a deaeration module for deaerating the coating solution supplied to the dispenser, the deaeration module including hollow fiber membranes.

7. The preform coating device according to claim 1, wherein the coating solution is a barrier coating solution having a gas barrier property or a protective coating solution for protecting the barrier coating solution.

8. A preform coating device having a horizontal direction normal to gravity, the preform coating device comprising:
   a rotary holder configured to:
      hold a preform comprised of an opening part, a hollow cylindrical body part adjoining the opening part, and a bottom part closing one end of the hollow cylindrical body part and having an axial line in the horizontal direction centered within the hollow cylindrical body part, and
      rotate the preform about the axial line, wherein the rotary holder grips the opening part of the preform and makes the preform rotate while a dispenser is discharging a coating solution;
   a preform support positioned, in a vertical direction, under a bottom part side end of the hollow cylindrical body part to support the bottom part side end of the hollow cylindrical body part of the preform while the dispenser is discharging the coating solution;
   a conveyor conveying the preform by moving the rotary holder;
   the dispenser discharging the coating solution toward the preform; and
   a dryer arranged separated from the dispenser and drying the coating solution coated on the preform,
   wherein the conveyor conveys the preform in a state held in the horizontal direction.

9. The preform coating device according to claim 8, wherein at least the part of the preform support contacting the preform is comprised of polyoxymethylene.

10. The preform coating device according to claim 8, wherein the rotary holder makes the preform rotate while the dryer is drying the coating solution.

11. The preform coating device according to claim 8, wherein
   the preform coating device comprises a plurality of rotary holders, and
   the conveyor successively conveys the plurality of preforms.

* * * * *